United States Patent [19]

Eckert

[11] Patent Number: 4,984,610
[45] Date of Patent: Jan. 15, 1991

[54] PROCESS FOR FILLING TRAVELING SILO CONTAINERS

[75] Inventor: Wolfgang Eckert, Rheinfelden, Fed. Rep. of Germany

[73] Assignee: Degussa, Fed. Rep. of Germany

[21] Appl. No.: 494,959

[22] Filed: Mar. 15, 1990

Related U.S. Application Data

[63] Continuation of Ser. No. 277,481, Nov. 15, 1988, abandoned, which is a continuation of Ser. No. 100,821, Sep. 25, 1987, abandoned, which is a continuation of Ser. No. 377,544, May 12, 1982, abandoned.

[30] Foreign Application Priority Data

May 22, 1981 [DE] Fed. Rep. of Germany ....... 3120356

[51] Int. Cl.$^5$ ................................................. B65B 1/04
[52] U.S. Cl. ........................................... 141/5; 141/1; 141/11; 141/59; 141/231; 141/71; 406/171
[58] Field of Search ...................... 141/5, 11, 1, 10, 59, 141/231–233, 68–71; 55/431; 210/172; 406/171, 175, 146

[56] References Cited

U.S. PATENT DOCUMENTS

| | | | |
|---|---|---|---|
| 2,641,335 | 6/1953 | Berg | 141/59 |
| 3,063,477 | 11/1962 | Vogt | 141/5 |
| 3,348,589 | 10/1967 | Krauss | 141/231 X |
| 3,384,134 | 5/1968 | Hillerns | 141/10 |
| 3,588,179 | 6/1971 | Gifford | 406/171 X |
| 3,706,319 | 12/1972 | Neese et al. | 141/59 X |
| 3,814,149 | 6/1974 | Dunavant | 141/231 |
| 4,182,383 | 1/1980 | Adomitis et al. | 141/5 |

FOREIGN PATENT DOCUMENTS

| | | |
|---|---|---|
| 0024529 | 3/1981 | European Pat. Off. |
| 454738 | 6/1968 | Switzerland ........................ 406/175 |

Primary Examiner—Ernest G. Cusick
Attorney, Agent, or Firm—Cushman, Darby & Cushman

[57] ABSTRACT

Highly dispersed, powdery material is fluidized in a supply container 1, falls to the diaphragm pumps 2 and/or 3 and from there is pumped via the filling tube 4 and/or 5 into the horizontal or, in a given case tilted, storage container 6. Simultaneously the fluidizing air escapes through the values 7, 8, and 9 connected to the closed dome covers and/or through the filter tubes 10 arranged on the bottom of the storage vehicle container. The filter cloths 11, 12, and 13 arranged below the dome cover hold back the highly dispersed material. The pressure in the travelling storage container is controlled during the filling via the manometer 14.

8 Claims, 1 Drawing Sheet

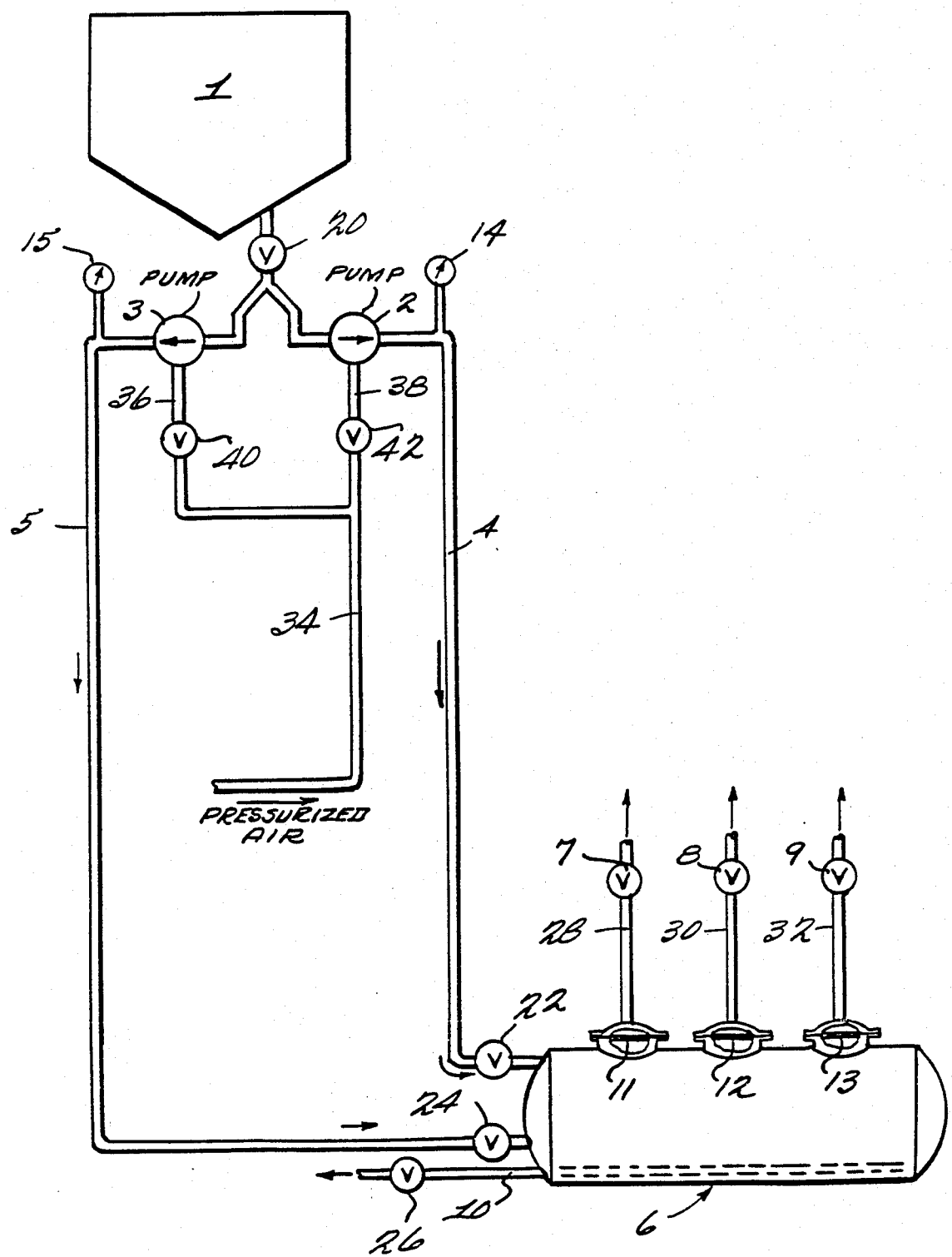

PROCESS FOR FILLING TRAVELING SILO CONTAINERS

This is a continuation of application No. 07/277,481, filed Nov. 15, 1988, which as abandoned upon the filing hereof, which is a continuation of 07/100,821, filed Sept. 25, 1987, which is a continuation of 06/377,544 filed May 12, 1982, all abandoned.

BACKGROUND OF THE INVENTION

The invention is directed to a process of filling storage vehicle containers with highly dispersed powdery materials.

Highly dispersed, powdery materials such as e.g. pyrogenically produced oxides of metals or metalloids, such as e.g. $Al_2O_3$, $SiO_2$ or $TiO_2$ are distinguished by an extreme degree of particle fineness and therewith through an extremely low packed density.

Thus pyrogenically produced silicon dioxide depending on the type, has an average particle diameter in the range of 5 to 50 nm. The packed density of the pyrogenically produced silicon dioxide (silica) can be between 20 and 60 g/l.

Because of this extremely low packed density, this type of highly dispersed, powdery material has a large transportation volume.

A reduction of the transportation volume by, for example, a vacuum deaeration on deaerating rolls before the filling of the storage vehicle has the disadvantage that specific maximum values for the packed density are exceeded. The result is that specific properties for industrial use as e.g., the thickening behavior, no longer are in accordance with the established requirements.

Furthermore, it is known that an improvement of the unfavorable volume/weight ratio with non deaerated, highly dispersed, powdery material can be attained by installing deaeration lines in the storage vehicle container through which the air is sucked off during the filling process. This process has the disadvantage that during the filling too great a vacuum can readily occur. Through this there is the danger of damage to the storage container.

The task of the invention is to so handle highly dispersed, powdery material in the filling of the travelling storage container that the transportation weight clearly is increased, without the properties for industrial use being damaged and without the need for expensive procedures, such as sucking off the air.

DETAILED DESCRIPTION

The invention is directed to a process for the filling of travelling storage container with highly dispersed, powdery materials which is characterized by fluidizing the material in the supply container, filling the fluidized material into one or more places of the travelling storage container by means of one or more compressed air diaphragm pumps, whereby the travelling storage container can be arranged slantingly or horizontally and the air can escape through opened valves which are connected to one or more dome covers, while the powdery material is held back through filter cloths connected to the dome covers.

In a preferred form of the process of the invention during the pumping in of the highly dispersed, powdery material, additionally the air can be allowed to escape from the travelling storage container through filter tubes, preferably 6 to 18 pieces. These are arranged at the bottom of the storage vehicle and connected to the outside air via a common collection line.

The pressure equalization can take place completely during the filling process. In a preferred form of the process of the invention during the filling process there can prevail an excess pressure of up to 0.1 bar below the maximum pressure limit of the travelling storage container without damaging the industrial application properties of the powdery material.

The process of the invention is especially suited for pyrogenically produced oxides of metals and/or metalloids, e.g. alumina, zirconia, or titania and especially for pyrogenically produced silica.

The process of the invention has the advantage that highly dispersed, powdery material can be pumped in the greatest possible amount into a travelling storage container without requiring an additional procedure such as sucking air out of the travelling storage container and without damaging the industrial application properties of the material filled into the container.

Because of the process of the invention it is possible for example to pump 4 metric tons of pyrogenically produced silicon dioxide in 2.5 hours into a travelling storage container having a volume of 55 $m^3$ without air being required to be removed via a suction line. Thereby the bulk density of the pyrogenically produced silica is doubled without harming the industrial application properties

BRIEF DESCRIPTION OF THE DRAWING

The single figure of the drawings show a schematic arrangement of the apparatus employed.

DETAILED DESCRIPTION

Referring to the drawing for example, pyrogenically produced silica falls from supply container 1 via valve 20 to the diaphragm pump 2 and/or 3 and from there is pumped via filling tube 4 and/or 5 and valve 22 and/or 24 into the horizontally disposed, or in a given case tilted, travelling storage containers.

Simultaneously air escapes through one or more of the valves 7, 8, and 9 in each case connected to the dome cover via tubes 28, 30 and 32 and/or escapes through the filter tubes 10 (and valve 26) in the bottom of the travelling storage container and connected with the outside air by a common collection line. The filter cloths 11, 12 and 13 arranged below the domed cover hold back the highly dispersed, powdery material.

Compressed air is supplied to the diaphragm pumps 2 and 3 via lines 34 and 36 or 38 and valves 40 or 42.

The pressure is controlled during the filtering via the monometer 14 and/or 15 and in a given case, corrected in case it exceeds 1.9 bar when the highest pressure limit of the travelling storage container is 2.0 bar.

What is claimed is:

1. A process of filling a substantially rigid traveling storage container having at least one dome cover with pyrogenically produced silica comprising:
   fluidizing pyrogenically produced silica in a supply container;
   providing a substantially rigid traveling storage container having at least one dome cover and at least one inlet disposed away from the at least one dome cover;
   filling the substantially rigid traveling storage container by supplying the fluidized silica from said supply container to at least one inlet of the storage container disposed away from the at least one dome cover with the aid of at least one compressed air diaphragm pump, a main axis of the traveling storage container being one of horizontal and at an angle to the horizontal; and allowing air to escape without suction through at least one opened valve connected to at least one said dome cover for said container while preventing the silica from escaping through the dome cover by means of a filter disposed in the dome cover, the pressure in the traveling storage container during the filling being a superatmospheric pressure up to 0.1 bar below the pressure limit of the container.

2. A process according to claim 1 comprising simultaneously removing air from the bottom of the travelling storage container through a filter tube which is connected to the outside air via a common collection line.

3. A process according to claim 2 wherein the pressure in the travelling storage container during the filling is a superatmospheric pressure up to 0.1 bar below the pressure limit of the container.

4. A process according to claim 1 wherein the pressure in the travelling storage container during the filling is a superatmospheric pressure up to 0.1 bar below the pressure limit of the container.

5. A process according to claim 1 wherein the main axis of the travelling storage container is horizontal.

6. A process according to claim 5 the process comprising filling the storage container through said at least one inlet being parallel to the horizontal axis, the air escaping through one or more of the at least one dome covers being perpendicular to the horizontal axis.

7. A process according to claim 1, wherein said travelling storage container having a volume capacity of up to 55 m$^3$ is filled with at least 4 metric tons of silica.

8. A process of filling a substantially rigid traveling storage container having at least one dome cover with pyrogenically produced metal oxide, or metalloid oxide comprising:

fluidizing one of pyrogenically produced metal oxide and metalloid oxide with air in a supply container;

providing a substantially rigid traveling storage container having at least one dome cover and at least one inlet disposed away from the at least one dome cover;

filling the substantially rigid traveling storage container by supplying the fluidized pyrogenically produced metal oxide or metalloid oxide to at least one inlet of the storage container disposed away from the at least one dome cover with the aid of at least one compressed air diaphragm pump, a main axis of the traveling storage container being one of horizontal and at an angle to the horizontal; and allowing the air to escape without suction through at least one open valve connected to at least one dome cover for said container while preventing the pyrogenically produced metal oxide or metalloid oxide from escaping through the dome cover by means of a filter disposed in the dome cover, the pressure in the traveling storage container during the filling being a superatmospheric pressure up to 0.1 bar below the pressure limit of the container.

* * * * *